United States Patent
Reisinger et al.

(10) Patent No.: US 10,782,398 B2
(45) Date of Patent: Sep. 22, 2020

(54) APPARATUS FOR DETERMINING A DISTANCE BETWEEN AN ANCHOR AND A TAG

(71) Applicants: Continental Automotive GmbH, Hannover (DE); Bayerische Motoren Werke AG, Munich (DE); NXP B.V., Eindhoven (NL)

(72) Inventors: Thomas Reisinger, Regenstauf (DE); Stefan Haller, Wenzenbach (DE); Daniel Knobloch, Munich (DE); Wolfgang Kuechler, Graz (AT); Frank Leong, Veldhoven (NL)

(73) Assignee: Continental Automotive GmbH, Hannover (DE)

( * ) Notice: Subject to any disclaimer, the term of this patent is extended or adjusted under 35 U.S.C. 154(b) by 329 days.

(21) Appl. No.: 15/923,623

(22) Filed: Mar. 16, 2018

(65) Prior Publication Data

US 2018/0275268 A1   Sep. 27, 2018

Related U.S. Application Data

(60) Provisional application No. 62/477,069, filed on Mar. 27, 2017.

(30) Foreign Application Priority Data

Mar. 28, 2017  (DE) .................. 10 2017 205 198

(51) Int. Cl.
*G01S 13/76* (2006.01)
*H04L 7/00* (2006.01)
*G06K 7/10* (2006.01)

(52) U.S. Cl.
CPC ........ *G01S 13/765* (2013.01); *G06K 7/10306* (2013.01); *H04L 7/0008* (2013.01); *Y02D 30/70* (2020.08)

(58) Field of Classification Search
CPC combination set(s) only.
See application file for complete search history.

(56) References Cited

U.S. PATENT DOCUMENTS

| | | | |
|---|---|---|---|
| 9,709,663 B1* | 7/2017 | Ciholas | G01S 5/0221 |
| 2006/0187909 A1 | 8/2006 | Sho et al. | |
| 2013/0021206 A1* | 1/2013 | Hach | G01S 5/021 342/451 |
| 2014/0035732 A1 | 2/2014 | Karr et al. | |
| 2014/0253388 A1* | 9/2014 | Jalali | G01S 5/06 342/458 |
| 2016/0143078 A1* | 5/2016 | Jeong | H04W 28/0278 370/329 |
| 2017/0251449 A1* | 8/2017 | Malik | H04W 56/0065 |

(Continued)

FOREIGN PATENT DOCUMENTS

| CN | 1754358 A | 3/2006 |
|---|---|---|
| CN | 101849368 A | 9/2010 |
| CN | 103595451 A | 2/2014 |

*Primary Examiner* — Mamadou L Diallo

(57) ABSTRACT

The disclosure relates to distance determining apparatus for determining a distance between an anchor and a tag. The apparatus is configured to select a first frame type or a second frame type for a message that is to be transmitted, to optimize an energy of the first frame type for a secure preamble detection, and to optimize an energy of the second frame type for a data transmission.

11 Claims, 2 Drawing Sheets

(56) References Cited

U.S. PATENT DOCUMENTS

| | | | | |
|---|---|---|---|---|
| 2017/0357934 A1* | 12/2017 | Cobb | ............... | G06Q 10/087 |
| 2018/0152903 A1* | 5/2018 | Shavit | ............... | G01S 5/0226 |
| 2018/0254925 A1* | 9/2018 | Dutz | ............... | H04L 25/0212 |
| 2018/0356492 A1* | 12/2018 | Hamilton | ............ | G01S 13/76 |
| 2019/0129446 A1* | 5/2019 | Kaufmann | ......... | G01S 5/0289 |
| 2019/0347452 A1* | 11/2019 | Bergonzi | ......... | G06K 19/0717 |

* cited by examiner

APPARATUS FOR DETERMINING A DISTANCE BETWEEN AN ANCHOR AND A TAG

BRIEF DESCRIPTION OF THE DRAWINGS

Exemplary embodiments of the disclosure are explained in more detail with reference to the schematic drawing below, wherein elements that are the same or similar are provided with the same reference signs. Here.

DETAILED DESCRIPTION

Figure 1:
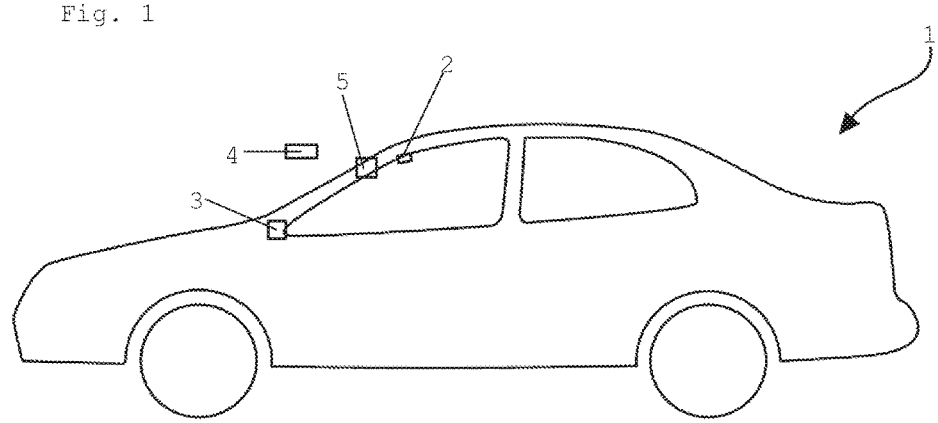
FIG. 1 shows a side view of a tag in a vehicle key and a vehicle with a plurality of anchors.

The disclosure relates to an apparatus and a method for determining a distance between an anchor and a tag.

The use of UWB frames according to IEEE802.15.4 for determining the distance between anchor and tag is known. In particular, proprietary solutions are known that provide a distance bounding utilizing a UWB technology. UWB stands for "ultra-wideband", and permits the use of extremely wide frequency ranges with a bandwidth of at least 500 MHz or of at least 20% of the mean arithmetic value of a lower and upper limit frequency of a used frequency band.

The use of so-called "2-way ranging schemes", which start from the tag, is also known. A so-called "short frame mode" furthermore enables power efficiency and spectral efficiency. Performing a ranging between a tag and N anchors, which permits ranging cycles with known message timing, is also known. The energy within a frame can also be varied through suitable measures (e.g. different pulse amplitudes or PRF), in order to achieve a balance in performance between synchronization, first-path detection and data transmission. The use of a secure preamble to secure ranging information (distance bounding) is, furthermore, known.

The disclosure is based on the object of improving an apparatus and a method for determining a distance between an anchor and a tag, wherein a localization can be performed by means of UWB with a protocol suitable for that purpose.

The object is achieved by the objects of the independent claims. Advantageous forms of embodiment are objects of the dependent claims, the following description, and the figures.

An apparatus for determining a distance between an anchor and a tag is provided according to a first aspect of the disclosure. This determination of distance can also be referred to as "ranging". The apparatus is designed to select a first frame type or a second frame type for a message that is to be transmitted, to optimize an energy of the first frame type for a secure preamble detection, and to optimize an energy of the second frame type for a data transmission.

In other words, different frame types can be used which distribute the energy differently over their frame sections. The first frame type is here optimized for a preamble detection, and the second frame type is optimized for a data transmission. It is provided in particular that the message to be transmitted is transmitted by means of UWB technology. Under the constraints of a limited signal energy (per millisecond), power efficiency and spectral efficiency/channel occupancy, the first frame type enables an optimization of the performance for ranging ("first path detection secure preamble", "first path detection sensitivity", "first path dynamic range", resistance to distance decreasing attacks), and the second frame type permits an optimization of the data transmission.

According to one form of embodiment, it is provided that the apparatus is designed to implement the first frame type as a poll-ranging frame, as a response-ranging frame or as a final-ranging frame. In particular, a ranging sequence can contain a poll-ranging frame from the tag to the anchor, a response-ranging frame from the anchor to the tag, and a final-ranging frame from the tag to the anchor in the said sequence. The final-ranging frame can here be accompanied by a message of the second frame type, wherein the accompanying message transports timestamp data from the tag to the anchor. This form of embodiment permits an optimum transmission of the timestamp from the tag to the side of the anchor.

It is furthermore advantageously provided that the apparatus is designed to provide a data part of the first frame type and/or of the second frame type with synchronization information for the synchronization of at least one anchor to ranging cycles. In this way a synchronization of the anchor or of the anchors to the ranging cycles (i.e. the beginning of a ranging cycle) and frameslots is permitted.

In particular, the apparatus can be designed to give a data part of the first frame type an energy that is relatively low in comparison to other parts of the first frame type. The data part thus only contains a relatively low energy, and only impairs the preamble detection to an insignificant degree.

The apparatus can furthermore be designed to instruct synchronized anchors to ignore the data part of the first frame type. Synchronized anchors can thus ignore the data part, i.e. the data of the data part, since this is not necessary for the preamble detection.

Alternatively or in addition, the apparatus can be designed to instruct non-synchronized anchors to read the data part of the first frame type if the non-synchronized anchors do not detect a secure preamble of the first frame type. The non-synchronized anchors can thus read the data from the data part of the first frame type even when the non-synchronized anchors do not detect the secure preamble.

It is provided according to a further form of embodiment that the apparatus is designed to provide the second frame type without a secure preamble, and to concentrate all the energy of the second frame type into a synchronization header and into a data part. The second frame type thus does not contain a secure preamble, and all the energy is concentrated into the synchronization header and the data part. In particular, the data part of the second frame type can furthermore exhibit a different modulation or a different encoding from the data part of the first frame type.

It is provided according to a further form of embodiment, that the apparatus is designed to provide the first frame type and/or the second frame type with a header which is designed to indicate the respective frame type to a receiver.

The frames thus have headers that are suitable for indicating the frame type to the receiver, and for keeping flexibility open for further frame types.

The above-described apparatus according to the disclosure can, in particular, be used for determining a distance between a transceiver arrangement of a vehicle and a radio key that is assigned to the vehicle. In this sense, the anchor can be an element of a transceiver arrangement which can be arranged at or in a vehicle, and the tag can be an element of a radio key or of a smartphone that is assigned to the vehicle.

A method for determining a distance between an anchor and a tag is provided according to a second aspect of the disclosure. The method comprises a selection of a first frame type or a second frame type for a message that is to be transmitted, an optimization of an energy of the first frame type for a secure preamble detection, and an optimization of an energy of the second frame type for a data transmission.

To avoid repetition, reference is made to the above explanations in association with the apparatus according to the first aspect of the disclosure in terms of the effects, advantages and forms of embodiment of the method according to the second aspect of the disclosure. The functional features in particular described in association with the forms of embodiment of the apparatus according to the first aspect of the disclosure can be employed as corresponding method features for corresponding forms of embodiment of the method according to the second aspect of the disclosure.

According to a third aspect of the disclosure, a program element is provided which, when it is executed on a processor, instructs the processor to carry out the method steps of the method according to the second aspect of the disclosure.

According to a fourth aspect of the disclosure, a computer-readable medium is provided on which a program element is stored which, when it is executed on a processor, instructs the processor to carry out the method steps of the method according to the second aspect of the disclosure.

The present disclosure permits an altogether better link budget in the system than when known apparatuses or methods are used.

An optimum first-path detection is furthermore possible (in particular for a short frame mode). A particularly robust synchronization of one or more anchors is, furthermore, enabled (Anchors receive synchronization information even when they do not receive the tag).

FIG. 1 shows a vehicle 1, which in the exemplary embodiment shown is a passenger vehicle. A plurality of anchors are arranged within and at the vehicle 1, of which a first anchor 2, for example a synchronized anchor, and a second anchor 3, for example a non-synchronized anchor, are visible in FIG. 1. In particular, the first anchor 2 and the second anchor 3 can each be an element of a transceiver. FIG. 1 furthermore shows a tag 4, which can in particular be an element of a radio key that is assigned to the vehicle 1. FIG. 1 furthermore shows an apparatus 5 for determining a distance between the anchors 2, 3 and the tag 4. The apparatus 5 is communicatively connected with the anchors 2, 3 and the tag 4. The apparatus 5 can, furthermore, in particular be implemented through software.

Messages can be exchanged between the anchors 2, 3 and the tag 4 (cf. FIG. 6), which are also referred to as frames (cf. 2 to 5) in order to determine approximately a distance between the anchors 2, 3 and the tag 4.

The apparatus 5 is designed to select a first frame type (cf. FIGS. 2 and 4) or a second frame type (cf. FIGS. 3 and 5) for a message that is to be transmitted. An energy of the first frame type 6 can, furthermore, be optimized for a secure preamble detection by means of the apparatus 5, and an energy of the second frame type 7 optimized for a data transmission.

Figure 2:
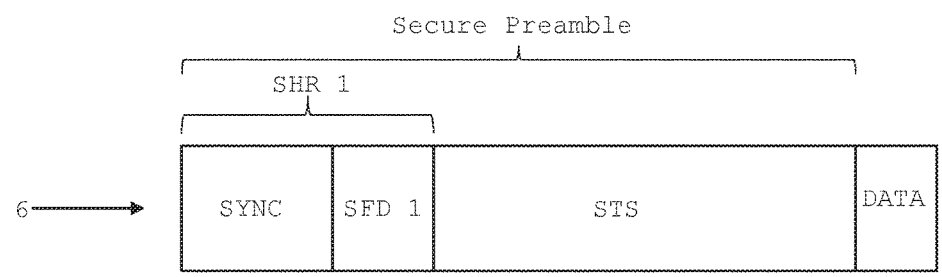
FIG. 2 shows components of an exemplary embodiment of a first frame type for a message that is to be transmitted.

FIG. 2 shows a first frame type 6, which comprises a synchronization part SYNC, a start of frame delimiter SFD 1, a secure training sequence STS and a data part DATA. The synchronization part SYNC and the start of frame delimiter SFD 1 together form a first synchronization header SHR 1. Together with the secure training sequence STS, the synchronization header SHR 1 forms a secure preamble.

The synchronization part SYNC can, for example, have a length of 64 μs, the start of frame delimiter SFD 1 can, for example, have a length of 4 μs, and the secure training sequence STS can, for example, have a length of 64 μs. The signal strength of the synchronization part SYNC and of the start of frame delimiter SFD 1 can, for example, be positioned at 0 dB, whereas the signal strength of the secure training sequence STS can, for example, be positioned at −6 dB. The energy of the relevant part of the first frame type 6 can be derived from the respective signal strengths.

The data part DATA can, for example, merely contain a crypto-ID, and can exhibit a relatively short length in time and a relatively low signal strength in comparison to the secure preamble. Alternatively, the data part DATA can also contain synchronization information for the synchronization of the anchors 2, 3 (cf. FIG. 1) to ranging cycles. In comparison with other parts of the first frame type 6, the data part DATA of the first frame type 6 is given a relatively low energy. This first frame type 6 is optimized in this way for a preamble detection.

The synchronized anchor 2 of FIG. 1 can, for example, ignore the synchronization information in the data part DATA of the first frame type 6. The non-synchronized anchor 3 of FIG. 1 can, furthermore, read the synchronization information in the data part DATA of the first frame type 6 if the non-synchronized anchor 3 does not detect the secure preamble of the first frame type 6.

Figure 3:
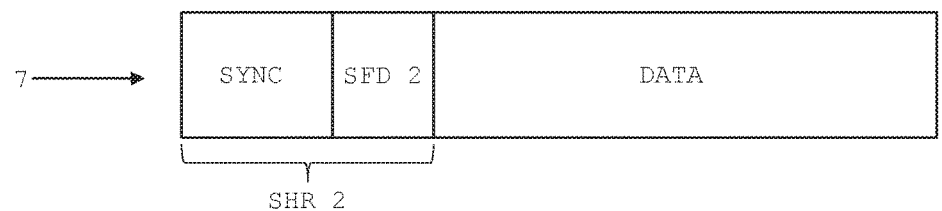
FIG. 3 shows components of an exemplary embodiment of a second frame type for a message that is to be transmitted.

FIG. 3 shows a second frame type 7, which comprises a synchronization part SYNC, a start of frame delimiter SFD 2 and a data part DATA. The synchronization part SYNC and the start of frame delimiter SFD 2 together form a second synchronization header SHR 2. A secure training sequence STS is not provided in the second frame type 7. All of the energy of the second frame type 7 is instead concentrated on the synchronization header SHR 2 and the data part DATA. As can be seen from FIG. 3, the data part DATA occupies a large proportion of the second frame type 7, which also has an effect in particular on the energy distribution, which is optimized for the transmission of the data of the data part DATA.

The data part DATA can contain synchronization information for the synchronization of the anchors 2, 3 (cf. FIG. 1) to ranging cycles. The data part DATA of the second frame type 7 can furthermore exhibit a different modulation or a different encoding from the data part DATA of the first frame type 6.

Figure 4:
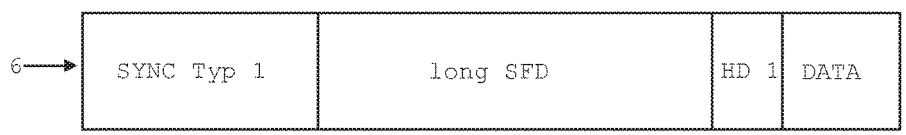
FIG. 4 shows components of a further exemplary embodiment of a first frame type for a message that is to be transmitted.
Figure 5:
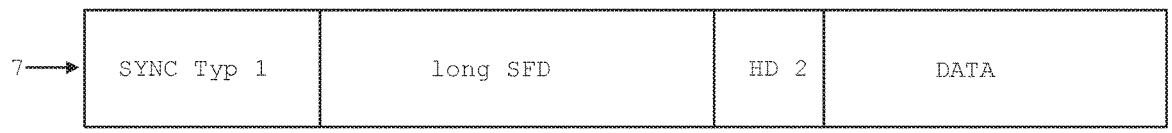
FIG. 5 shows components of a further exemplary embodiment of a second frame type for a message that is to be transmitted.

FIGS. 4 and 5 show respectively an alternative first frame type and a second frame type 7, each of which additionally comprises in particular a header HD 1 or HD 2, in order to indicate the respective frame type 6 or 7 to a receiver.

Figure 6:
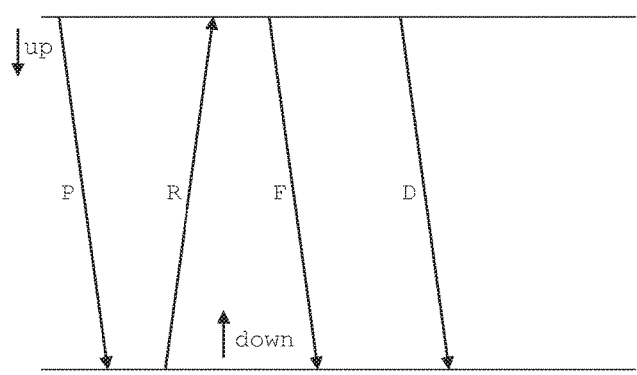
FIG. 6 shows an illustration of messages transmitted within a ranging sequence against time.

FIG. 6 shows an exemplary ranging sequence with a poll-ranging frame P from a tag to an anchor, with a response-ranging frame R from the anchor to the tag, and with a final-ranging frame F from the tag to the anchor, which are transmitted and received in the said sequence. The poll-ranging frame P, the response-ranging frame R, and the final-ranging frame F are designed as the first frame type (cf.

FIGS. 2 and 4). The final-ranging frame F is accompanied by a data frame D (second frame type, cf. FIGS. 3 and 5), which transports timestamp data from the tag to the anchor.

The invention claimed is:

1. A distance determining apparatus for determining a distance between an anchor and a tag, wherein the apparatus is configured to:
   select a first frame type or a second frame type for a message that is to be transmitted,
   optimize an energy of the first frame type for a secure preamble detection,
   optimize an energy of the second frame type for a data transmission, and
   implement the first frame type as at least one of a poll-ranging frame, a response-ranging frame and as a final-ranging frame; and
   wherein the final-ranging frame is accompanied by a message of the second frame type, wherein the accompanying message transports timestamp data from the tag to the anchor.

2. The apparatus as claimed claim 1, wherein the apparatus is configured to provide a data part of at least one of the first frame type and the second frame type with synchronization information for the synchronization of the anchor to ranging cycles.

3. The apparatus as claimed in claim 1, wherein the apparatus is configured to give a data part of the first frame type an energy that is relatively low in comparison to other parts of the first frame type.

4. The apparatus as claimed in claim 3, wherein the apparatus is configured to instruct synchronized anchors to ignore the data part of the first frame type.

5. The apparatus as claimed in claim 3, wherein the apparatus is configured to instruct non-synchronized anchors to read the data part of the first frame type if the non-synchronized anchors do not detect a secure preamble of the first frame type.

6. The apparatus as claimed in claim 1, wherein the apparatus is configured to provide the second frame type without a secure preamble, and to concentrate all the energy of the second frame type into a synchronization header and into a data part.

7. The apparatus as claimed in claim 6, wherein the data part of the second frame type exhibits a different modulation or a different encoding from the data part of the first frame type.

8. The apparatus as claimed in claim 1, wherein the apparatus is configured to provide the first frame type and/or the second frame type with a header which is configured to indicate the respective frame type to a receiver.

9. The apparatus as claimed in claim 1, wherein the anchor is an element of a transceiver arrangement configured to be arranged at least one of at and in a vehicle, and wherein the tag is an element of at least one of a radio key and a smartphone that is assigned to the vehicle.

10. A method for determining a distance between an anchor and a tag, the method comprising the steps of:
    selecting a first frame type or a second frame type for a message that is to be transmitted,
    optimizing an energy of the first frame type for a secure preamble detection,
    optimizing an energy of the second frame type for a data transmission, and
    implementing the first frame type as at least one of a poll-ranging frame, a response-ranging frame and as a final-ranging frame; and
    wherein the final-ranging frame is accompanied by a message of the second frame type, wherein the accompanying message transports timestamp data from the tag to the anchor.

11. A non-transitory computer usable medium having a computer readable program code embodied therein, the computer readable program code adapted to be executed on a processor to implement a method of determining a distance as claimed in claim 10.

* * * * *